United States Patent [19]  [11] 4,264,657
Tollette  [45] Apr. 28, 1981

[54] FOAM BASED STRUCTURE #1

[75] Inventor: Henry B. Tollette, Sacramento, Calif.

[73] Assignee: Custom Made Packaging Inc., Sacramento, Calif.

[21] Appl. No.: 61,662

[22] Filed: Jul. 30, 1979

[51] Int. Cl.³ .......................... B32B 1/02; B32B 5/18; B32B 7/06; B32B 7/10
[52] U.S. Cl. ...................................... 428/35; 40/2 R; 40/615; 156/239; 156/249; 156/256; 156/277; 428/40; 428/202; 428/204; 428/211; 428/213; 428/215; 428/315; 428/354
[58] Field of Search ................. 40/2 R, 310, 324, 594, 40/615; 156/239, 240, 249, 256, 277; 428/40, 35, 202, 203, 204, 213, 211, 215, 315, 314, 354, 914

[56] References Cited
U.S. PATENT DOCUMENTS

| 3,262,827 | 7/1966 | Kallander et al. | 428/425 |
| 3,494,059 | 2/1970 | Minasian | 428/40 |
| 3,674,622 | 7/1972 | Plasse | 428/315 |
| 3,995,087 | 11/1976 | Desanzo | 428/40 |

FOREIGN PATENT DOCUMENTS 49-105886 7/1974 Japan ........................ 428/315

Primary Examiner—William J. Van Balen
Attorney, Agent, or Firm—Mark C. Jacobs

[57] ABSTRACT

A label for application to containers to be shipped under bottle-to-bottle contact conditions comprising a laminate structure comprising a film layer superposed over a layer having indicia printed thereon which in turn is superposed upon a foam layer.

The process of making the laminate is also disclosed.

20 Claims, 5 Drawing Figures

FOAM BASED STRUCTURE #1

BACKGROUND OF THE INVENTION

Although bulk packaging of glass bottles is not necessarily new, innovative approaches for shipping filled containers have increased its utilization.

Bulk packaging works best for cylindrical containers. Odd shapes such as decanters do not have sufficient stability to enable them to be shipped in this manner.

The surface condition of glass is extremely important in high-speed bulk and partitionless packaging systems. Due to the crystalline nature of raw glass, abrasion will occur whenever two such surfaces come into contact. Scratches caused by abrasion establish stress concentration points and can reduce container strength. Surface treatments to provide both abrasion protection and lubricity are a must for glass-to-glass contact.

This surface protection problem also arises when glass contacts metal components on high-speed handling and filling machinery.

For those applications where regulations will not allow glass-to-glass packaging, alternatives have been developed.

One example is the junior partition. This partition is placed between the containers after they have been inserted in the shipping case. It extends toward the sidewall only far enough to pick up the two-point contact on the outer row of containers. It extends upward as far as the upper contact point on the packed containers. This reduction from the full width and height partitions most often encountered can provide for some material savings.

Another development that provides an alternative for those unable to ship in a glass-to-glass configuration is the container having a thin layer of polystyrene foam around the bottle to protect the sides. The foam thickness is sufficient to take the place of partitions in many cases. The container has obtained approvals from the railroads for shipment of several different sizes in partitionless containers for food and beverage items.

One industry that has gone forward in developing and using the glass-to-glass shipping concept are the soft drink bottlers.

One company that has pioneered the soft drink bottle covering and/or label is Owens-Illinois. Some of their patents known to the applicant include:
Rhoades: U.S. Pat. No. 4,038,446
Karabedian: U.S. Pat. No. 3,979,000
Karabedian: U.S. Pat. No. 4,071,597
Rhoades: U.S. Pat. No. 4,034,131

Indeed, there have been many different types of laminates provided for forming labels wherein a foam laminate would be provided with a pressure sensitive adhesive layer thereon normally having a backing sheet applied thereto. In use of the laminate, printed data is applied to the face or top sheet in the laminate, the laminate is cut to desired label width, and provided to the user in suitable roll or other bulk form for removing the backing sheet material and applying the labels to the individual articles.

The big problem associated with all of the foam structures known here-to-fore, such as those recited above and in such other patents as Ryan U.S. Pat. No. 3,573,153 and Pesanzo U.S. Pat. No. 3,995,087 is the poor quality of the graphic material.

The general object of the present invention is to provide a novel and improved laminate for use in forming labels having high quality graphics.

Another object of the invention is to provide the label forming laminate comprising a clear plastic film top layer adapted to have printed data applied to a layer there beneath and with a foam layer being secured to the intermediate printed layer by an adhesive.

Yet another object of the invention is to provide a label forming laminate wherein the components thereof can be conventionally processed and laminated by existing apparatus and be easy to form, cut and use.

The foregoing and other objects and advantages of this invention will be made more apparent from the specification and the claims.

While all of the introductory material has used the term "glass to glass" contact, this term is somewhat a misnomer used in the art. Actually the term should be "bottle to bottle", or container to container, as the comments and problems are equally as applicable to plastic containers such as blow moulded polystyrene. Aside from the breakage problem, mere scratching of the surface makes the container less pleasing to the eye of the potential purchaser and thus should be avoided.

SUMMARY OF THE INVENTION

This invention provides a novel label for use on containers that are subjected to glass-to-glass packaging. That is, no corrugated board is used to separate one jar or bottle from those that are adjacent thereto. The label itself acts as a separator, to keep its container from contacting other containers adjacent thereto on the pallet or in the same shipping carton.

The label comprises a multi-layered structure comprising superposed layers of a film for protection of the graphic material said film being adhered to a paper layer having indicia thereon, which indicia is readable through the film. The paper in turn is adhered to a foam layer which serves to absorb the shock of impact of one container against another.

RELATIONSHIP TO OTHER COPENDING APPLICATIONS

In the copending application of Tollette filed concurrently herewith, Ser. No. 061,622, filing data July 30, 1979, there was described a laminate comprising superposed layers of transparent film, printed on the underside thereof, adhered to an intermediate paper layer, said paper layer being adhesed on its underside to a foam layer. The laminate is used as a packaging structure or a label.

DESCRIPTION OF THE PREFERRED EMBODIMENT

Figure 1:
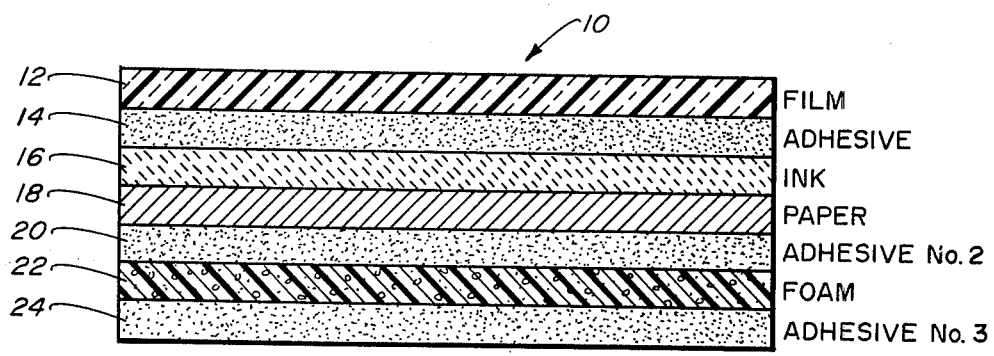
FIG. 1 is a schematic illustration showing a cross-section through the laminated structure of a label of this invention.

Reference now is made to the accompanying drawing which shows a cross section through the laminate embodying the principles of the invention.

In the drawing, the various layers thereof are shown in exaggerated thicknesses since all of such layers normally are in the vicinity or range of from about 0.00025 to about 0.25 inch in thickness. Corresponding numerals are used to refer to corresponding members or layers shown in the drawing and referred to in the specification to facilitate comparison therebetween.

The laminate of the invention is indicated as a whole by the numeral 10. The laminate can be cut to individual labels and be processed so as to be supplied to the end user for individual application of the labels to desired articles.

The laminate 10 comprises a face or top layer of a transparent, colored or colorless protective film. Typical among the films useable are cast or biaxially oriented polypropylene, low and high density polyethylene, and coextrusions of films of polyethylene with other monomers such as vinyl acetate, and coextrusions of two different densities of an olefin. Such films are readily available in the marketplace from numerous suppliers. In some instances it may be necessary to treat polyethylene using techniques known in the art to accept high temperature hot melt adhesives. Polyester films, e.g. Mylar ® may also be employed.

The underside of this film is adhered to a paper layer having indicia such as words pictures symbols and the like printed, screened or otherwise applied thereon. Details on inks suitable herein will be recited infra.

I have found that it is beneficial to utilize high wet strength paper. Typical of such paper is the 55 lb. paper made by Water Vliet Paper Company which has 150% wet strength of dry. The primary reason for preferring high wet strength paper over ordinary paper stock which of course is operable herein, is that when labels made from high wet strength paper are employed for beer and soft drink containers, the labels can be applied, prior to the marking of the outside of the bottle, which marking takes place either before or after filling. Thus it is seen that for non-liquid contents such as particulates wherein no washing step is employed, standard Kraft paper or label stock, as known in the industry may be employed.

Optimally the paper may be treated for chemical resistance such as by the application of Scotchguard ® FC807 manufactured by the 3M Company.

Suitable paper weights range 45 lbs. (4 mil) to 90 lbs. (9 mil) per ream.

In addition to standard paper or label stock, I have found that clay coated paper and other specialty papers used in label making can contribute to improved appearance of the laminates. Thus metallized coated papers available from sources as King Seely, and Nicolet may be employed herein as well. Obviously those skilled in the art can choose the proper inks to be employed with these specialty papers which themselves are a laminate of very thin foil on one side of a strip of paper.

When choosing paper for use in the preparation of the laminates of this invention, the only important criteria to be considered in making the choice, are the compatibility with the adhesive and the film layer. One readily recognizes that the film layer not only inhibits abrasion and tearing of the paper layer, but also inhibits solvent damage, such as water to both the ink and the paper.

Details concerning the foam layer, which serves to cushion the shock of container to container impact and the manner that the foam is attached to the underside of the intermediate layer are recited below.

Adhesive layer 14 which is applied to the underside of film layer 12 may be any suitable preferably transparent in the dry state adhesive. One such suitable class of adhesives are the urethanes such as Adcote 333 made by Morton Chemical Company. Also the Unoflex series of urethane adhesives made by Polymer Industries may be so employed. Other suitable products for adhesive 14 include the NCO-terminated polyesters of duPont and National Starch among others, and the thermoplastic acrylic adhesive resins sold by Stein Hall division of Cellanese Corporation, and by Rohm and Haas.

Inks employable in the manufacture of the laminates of this invention include any of the readily available pigmented and dye paper inks. One manufacturer of such products is I.P.I.

A second adhesive layer 20 is used to bond the paper to the foam. Due perhaps to the cellular nature of the foam it has been noted that larger quantities of adhesive are required to bond the paper to the foam than in the previous film to paper bonding.

For adhesive layer 20, I may employ a urethane such as Adcote 333 or acrylic based adhesives such as those made by Pierce and Stevens, and Celanese.

Other adhesive resins such as polyamides, polyesters, and others known to the laminating art may be employed.

It is to be noted that for this bonding the requirement of translucency is not present. Thus any adhesive capable of binding foam to paper, which is not incompatible with either and which will not be readily dissolved by the contents of the container to which the laminate is applied, may be employed.

Obviously layer 20 need not be transparent or translucent. The opacity however should not from an esthetic point of view overcome the generally white color of the foam such as to render the rear side of the laminate unpleasing, nor should the opacity be detrimental to the appearance from the front by contributing a coloration to the paper layer.

Turning now to the foam, it is seen that the foam should preferably be of a closed cell type. The layer of foam may conveniently vary in thickness between 1/32nd and about 3/32nd inch thick. The cell size is not critical. Closed cell foams are not hygroscopic.

While a filled foam is operable, there is no reason to go to the expense to use filled foams when unfilled ones suffice.

Typical foam materials that are employable herein are polypropylene and polyethylene. In some instances the latter may require special treatment to be able to withstand the high temperatures of lamination, usually around 400°. Another foam that may be successfully employed is urethane foam, as sold by E. I. DuPont de Nemours under the trademark XC ™.

Details on the bonding of the foam to the paper are recited below.

Still other cellular materials employable herein include polystyrene alone or in combination with a copolymer of ethylene and vinyl acetate.

The third adhesive layer, designated 24 is applied to the laminate 10 by the ultimate user. Suitable adhesives include the so called semi pressure sensitive hot melts such as those comprising ethylene vinyl acetate copolymer with a resinous tackifier as exemplified by National Starch's Product 344994. Other suppliers include Borden and Amsco.

Other types of adhesives that may be employed by the jar labeler include thermoplastic and thermosetting resinous composition both solvent based and water based, applied as liquids.

Layer 24 when added by the user should be of a material that will not degrade the foam, nor contribute any type of displeasing esthetics to the completed label now mounted on a container.

It is seen that adhesive layer number 3 designated as 24 may be applied at the time of application of the laminate 10 of this invention to a jar, bottle or other container, by the end user. Such adhesive layer 24 may be sprayed, brushed or otherwise applied as is known to the art.

Figure 2:
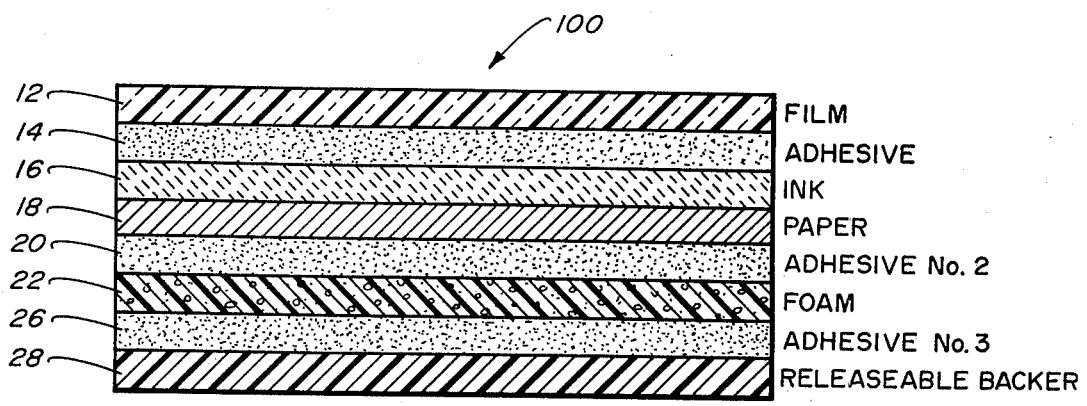
FIG. 2 is a similar view of an alternate embodiment.

An alternative means of applying the laminate to the container, is to employ the modified laminate 100 as shown in FIG. 2. In this embodiment, layers 12, 14, 16, 18, 20, and 22 are all as above. However, rather than applying adhesive 3 at the time of ultimate useage, adhesive 3 here designated as 26 is applied at the factory during the course of manufacture.

In this embodiment, the opposite face of the foam layer 22 has a layer 26 of a conventional pressure sensitive adhesive provided thereon and a releasable backing sheet 28 is attached to the remaining face or surface of the pressure sensitive adhesive layer 24. Obviously, such backing layer 28 is provided with a coating (not shown) of a release material on the surface thereof adjacent the pressure sensitive adhesive layer 26 whereby the backing layer can be released or disengaged from the adhesive layer 26 readily when desired. Any conventional release coating is provided on the backing layer 28 to contact the adhesive layer 26.

The backing sheet or layer 28 is usually a paper sheet and the release usually is a silicone composition.

PREPARATION OF THE LAMINATES

While there is no criticality assigned to the sequence of operations, I have found that the following procedure gives rise to satisfactory results.
A. Apply ink and graphic material to paper substrate.
B. Apply adhesive #1 to underside of film.
C. Bond film to inked paper surface under pressure.
D. Apply adhesive #2 to rear of paper.
E. Bond paper to foam under pressure.

Obviously adhesives #1 and #2 can be applied to either of the surfaces they are intended to adhere, not just the one recited above.

It is also to be understood that the use of pressure for bonding may require the application of some heat, but not enough to cause degradation of a substrate layer. It is within the skill of the art to choose the proper amount of heat to be applied.

The adhesion of paper to film is readily understood at the level of the state of the art today, and further details will not be recited.

For the foam to paper bonding, it is preferable to use a relatively larger quantity of adhesive than one would normally use in pressure bonding operations, coupled with a low pressure, on the order of less that 100 psi. In fact, good results have been obtained using 40 psi. Prior art bonding techniques employ about 1300 psi for foam to another substrate bonding. The use of excess adhesive with low pressure, ensures total coverage of the substrate by the adhesive, with the removal of any air gaps by the slight pressure. The technique ensures good bonds without fracturing of foam cells, or substantially diminishing foam thickness.

In order to ensure that excess space is not consumed on a shipping pallet or in a container, the labels of this invention are preferably not diecut in the manner of prior art labels. That is, one portion does not overlap another. For to do so would create a bulky label having two foam layers at the junction of the two label segments. Rather, the labels are cut with one end being convex, and one end being of a corresponding arc, but concave. When wrapped around a container, the convexity mates with the arc of the concavity to form a smooth butt end joint. Yet, at no point along the elevation of the label would an impinging article not contact a label portion. Therefore direct contact with the container at the slight space between abutting label portions is avoided.

The structure just described is intended for use primarily on glass or other breakable containers subject to impact. Such containers may be round or have a flat front and/or rear fare with curved sides such as those used for prescription liquids.

For container applications where container breakage is of a lesser hazard, standard square cut butt edge and even overlap seams may be employed. Such applications would include one portion servings of moodles and soup mix that require addition of water to the foam cup holding the contents.

It is seen that the foam portion of this label acts to retain heat or cold and to thereby provide insulation to the contents of the package. Such an application would be the noodle soup referred to above. Another application that would be a cold commodity would be an ice cream cup.

The following non-limiting examples illustrate laminates within the scope of the invention. In these examples, only the substrates are specifically recited.

I
Polypropylene Film
Hi Wet Strength Paper
Polypropylene Foam

II
Low Density Polyethylene Film
Standard "Label" Paper
Polypropylene Foam

III
Polyester Film
Chemical Resistant Paper
Polypropylene Foam

This is an excellent label for oil and chemical packages, example salad oil, or mayonaisse.

IV
Polyester Film
Foil over Paper Laminate
Polyurethane Foam

V
Low Density Polyethylene Film
High Wet Strength Kraft Paper
Polyethylene Foam

This is a low price label suitable for bottled water.

---
VI
ORIENTED POLYSTYRENE FILM
HIGH WET STRENGTH KRAFT PAPER
POLYETHYLENE FOAM
---

This laminate is highly suitable for soft drink containers.

In all of the laminates above, the paper is printed upon on the top side thereof.

While the thrust of this invention has been to disclose a label and the process for making same suitable for glass containers, obviously these labels can be used with plastic containers where there is risk of damage to the container or contents. Since these labels are of higher cost due to the plurality of manufacturing steps, one would not ordinarily use them if there were no need for the protection they afford. Thus it is seen that another excellent situation for their use is on ceramic collector-decorator whiskey bottles.

In addition to the above, the labels of this invention can be employed where insulation capability is desired separate from the problem of chemical degradation of the label. Thus ice cream containers of card stock, metal, plastic or even glass can be covered in whole or in part with labels prepared according to this invention.

Figure 3:
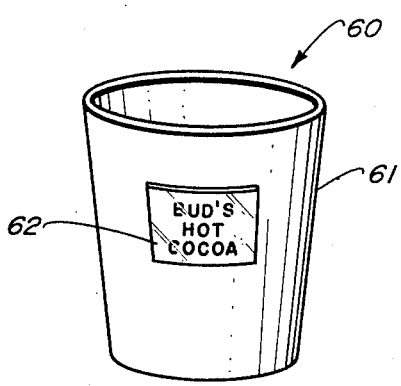
FIG. 3 is an elevational view of a device that incorporates a modification of the embodiment of FIG. 1.

In addition it is seen that foam based structures such as styrofoam cup 61 of FIG. 3 can be prepared with an advertising message on the side thereof. The message 66 is printed on the paper layer 63 which is laminated to protective film 62 yielding a composite 64 which is then bonded to the foam cup 61 to yield the desired end product advertising specimen 60.

It is seen therefore that the paper-protective film pre-laminate need not be coextensive in dimensions with the foam substrate.

Figure 4:
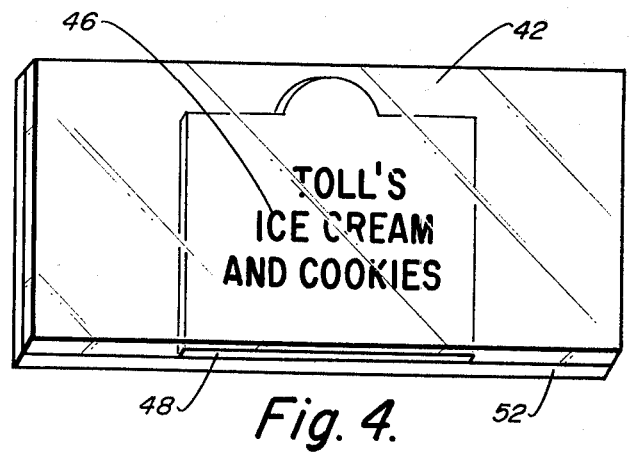
FIG. 4 is a schematic illustration showing a perspective view of another embodiment of the laminate of this invention.

It is also within the scope of the invention to have a portion of the film to be directly bonded to the foam to give a gloss finish to the foam, with the graphic containing paper being of smaller dimensions. Reference is made to FIG. 4.

In FIG. 4 film 42 is seen to overlie paper layer 48 which has graphic message 46 thereon. For ease of understanding the adhesive layers are not specifically depicted in the figure. Layer 52, the foam is adherent in part directly to film 42 and in part to paper 48 where such is present to avoid extra labor the use of one adhesive coating beneath the film capable of adhesion to both paper and foam is preferred. This coating should be preferably transparent.

Figure 5:
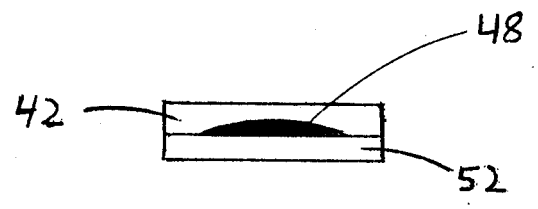
FIG. 5 is a front cross sectional elevation of the embodiment of FIG. 4.

Since the thickness of the film is relatively small and there is little or no difficulty in trying to interpose the paper insert 48 at the location shown between the foam 52 and the film 42. See FIG. 5.

In the manufacture of this embodiment the paper would be preadhesed to the preprinted film and the foam 52 added thereafter. Normal lamination of normal adhesive—high pressure would be employed to secure the paper to the film. The composite of the film bearing the dimensionally smaller paper layer would be adhesed to the foam using a high adhesive content,—in the order of 4× normal adhesive and the previously discussed low pressure bonding technique to secure both the underside of the paper to the foam, and the surrounding film to the foam.

This order of process steps is deemed important, since an attempt to preadhese the paper to the foam, followed by normal high pressure lamination of film to paper will crush the foam cells, and because high adhesive low pressure bonding of film to paper will yield bubbles in the film, not esthetically pleasing.

In this embodiment the invention is used for labeling as part of a structure rather than as a separate label. For example, utility would include a box for taco shells, or as shown here for ice cream sandwiches.

Other than as indicated, any order of assembly of the three substrates may be employed. It is also seen that the dimensions of each layer need not be coextensive, as has been illustrated by the cup of FIG. 3 and the structure suitable for an ice cream container in the embodiment of FIG. 4.

The bonding of the film to the paper can be carried out using conventional technology and pressures of from about 20 to about 200 psi, even higher if the paper layer is a foil-paper laminate.

The bonding of the foam to the paper has been indicated to be also a low pressure lamination of under 100 psi. Pressures as low as 12 psi have been successfully employed. The important factor is not to crush the foam cells. Obviously, thinner foam cross-sections can withstand less pressure.

For the embodiment of FIG. 3, the standard mode of manufacture can be employed.

For the embodiment of FIG. 4, a uniform pressure may be applied to the film to adhere it to both the foam and the paper. The pressure being within the range of from about 12 to 100 psi.

In addition to all of the film forming polymers previously recited, I can also employ oriented polystyrene, which is clear glossy and low in price, cellulosic films such as cellophane and cellulose acetate. Other usable films include vinyl acetate, vinyl chloride and vinylidene chloride polymers and copolymers.

Since certain changes may be made in the above apparatuses and processes without departing from the scope of the invention herein involved. It is intended therefore, that all matter contained in the above description shall be interpreted as illustrative and not in a limiting sense.

I claim:

1. A flexible laminate for labels and labeling comprising superposed layers of:
    (a) protective transparent film
    (b) a paper layer having top and bottom surfaces, adapted to have printed indicia applied to the top surface thereof,
    (c) a foam layer
    (d) layers of adhesive bonding said film to the top surface of said paper and the bottom surface of said paper to said foam wherein all layers are of a thickness in the range of from 0.00025 to 0.25 inches.

2. A flexible laminate for labels and labeling comprising:
    a foam support having obverse and a reverse side, and having a layer of paper adapted to receive indicia mounted on the obverse side of said support, and
    a protective film layer mounted on said paper neither layer being thicker than about 0.25″.

3. The laminate of claim 1 wherein the paper is a prelaminate of a metallic foil and paper.

4. The laminate of claim 1 wherein the length and width of each of the layers is the same.

5. The laminate of claim 2 wherein a pressure sensitive adhesive on a backing sheet is mounted on the reverse side of said foam support.

6. The laminate of claim 1 wherein the film is selected from the group consisting of polypropylene and polyethlene.

7. The laminate of claim 3 wherein the film is selected from the group consisting of styrene and cellulose polymers.

8. The laminate of claim 1 wherein the foam layer is polypropylene.

9. The laminate of claim 2 wherein the foam support is polystyrene.

10. A flexible laminate for labels and labeling comprising:
(a) a protective film layer bonded to a foam support;
(b) a printed paper layer having either or both of its length and width of dimensions smaller than the film layer interposed between said film and said foam, and bonded to said film and said foam.

11. The laminate of claim 1 wherein the film layer and paper layer are of substantially equal dimension.

12. A label of the laminate of claim 1 having a top and bottom edge and two side edges wherein one of said side edges is concave and the other is convex, the arc segment of each being the same.

13. The laminate of claim 6 further including a pressure sensitive adhesive on the foam surface and a backing sheet for said adhesive.

14. The laminate of claim 2 wherein the film and foam are each selected from the group consisting of polyethylene and polypropylene.

15. A process for the manufacture of laminates for labels which comprises
(a) bonding the side of a paper substrate having printed indicia thereon to a protective film with adhesive and pressures, and
(b) bonding the pre-laminate of the previous step to a foam substrate using a high excess of adhesive and pressure of less than about 100 psi.

16. A process for the manufacture of laminates for labels and labeling which comprises:
(a) bonding a paper layer adapted to receive graphic material to a foam substrate using a high excess of adhesive and pressure of less than about 100 psi, and
(b) bonding a protective film to the paper layer under pressure insufficient to be deleterious to the cell structure of the foam.

17. The process of claim 15 further including the steps of cutting the one side of the laminate concave and the other side convex with the arc segment of each being the same.

18. The process of claim 16 further including the steps of cutting the one side of the laminate concave and the other side convex with the arc segment of each being the same.

19. A process for the manufacture of laminates for labels and labeling which comprises:
(a) adhesively bonding the side of a paper substrate that has printed indicia thereon to a protective film under pressure wherein said paper is dimensioned smaller than said film,
(b) bonding said film and the second side of the paper to a foam substrate.

20. A container having printed indicia thereon comprising a foam container having a layer of printed paper adhesed on the non-printed side to said foam container, and a layer of protective film adhesed at least to said paper.

* * * * *